United States Patent [19]
Vojnovich

[11] Patent Number: 5,423,020
[45] Date of Patent: Jun. 6, 1995

[54] APPARATUS AND METHOD FOR OPTIMIZING BUS USAGE BY VARYING THE AMOUNT OF DATA TRANSFERRED ON A DMA OPERATION

[75] Inventor: Theodore B. Vojnovich, Cary, N.C.

[73] Assignee: International Business Machines Corporation, Armonk, N.Y.

[21] Appl. No.: 160,452

[22] Filed: Dec. 1, 1993

Related U.S. Application Data

[63] Continuation of Ser. No. 514,475, Apr. 25, 1990, abandoned.

[51] Int. Cl.⁶ ............................................. G06F 13/28
[52] U.S. Cl. .................. 395/425; 364/245.1; 364/254.3; 364/242.33; 364/961.1; 395/250; 395/275
[58] Field of Search ... 364/200 MS File, 900 MS File; 395/400 MS, 425 MS

[56] References Cited

U.S. PATENT DOCUMENTS

| | | | |
|---|---|---|---|
| 4,315,330 | 2/1982 | Brickman et al. | 370/104 |
| 4,418,382 | 11/1983 | Larson et al. | 395/200 |
| 4,493,028 | 1/1985 | Heath | 395/325 |
| 4,545,014 | 10/1985 | Oguchi | 364/200 |
| 4,658,349 | 4/1987 | Tabata et al. | 364/200 |
| 4,716,525 | 12/1987 | Gilanyi et al. | 395/250 |
| 4,729,090 | 3/1988 | Baba | 364/200 |
| 4,748,588 | 5/1988 | Norman et al. | 395/550 |
| 4,807,112 | 2/1989 | Hamasaki | 364/200 |
| 4,847,750 | 7/1989 | Daniel | 364/200 |
| 4,933,846 | 6/1990 | Humphrey et al. | 395/325 |
| 4,999,769 | 3/1991 | Costes et al. | 364/200 |
| 5,003,465 | 3/1991 | Chisholm et al. | 395/425 |
| 5,019,962 | 5/1991 | Funabashi et al. | 364/200 |
| 5,063,533 | 11/1991 | Erhart et al. | 395/425 |
| 5,121,480 | 6/1992 | Bonke et al. | 395/250 |

*Primary Examiner*—Reba I. Elmore
*Attorney, Agent, or Firm*—Jerry W. Herndon; Homer L. Knearl

[57] ABSTRACT

A system including a DMA controller for dynamically varying the size of DMA transfers. The controller includes means for buffering data blocks from the device as they arrive and means for dynamically activating a DMA operation and for varying the amount of data transferred on a DMA operation depending on the recent arrival rate of data and the amount of data already buffered for DMA transfer.

11 Claims, 3 Drawing Sheets

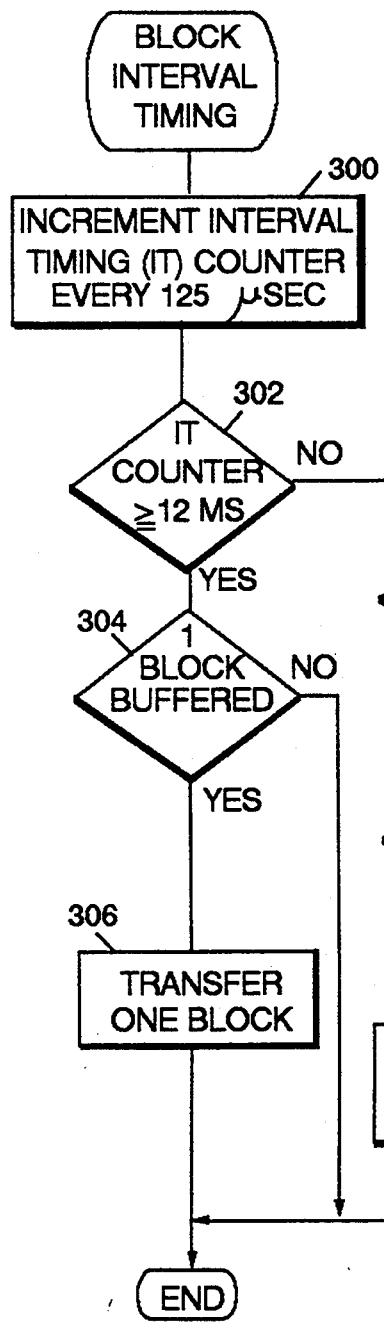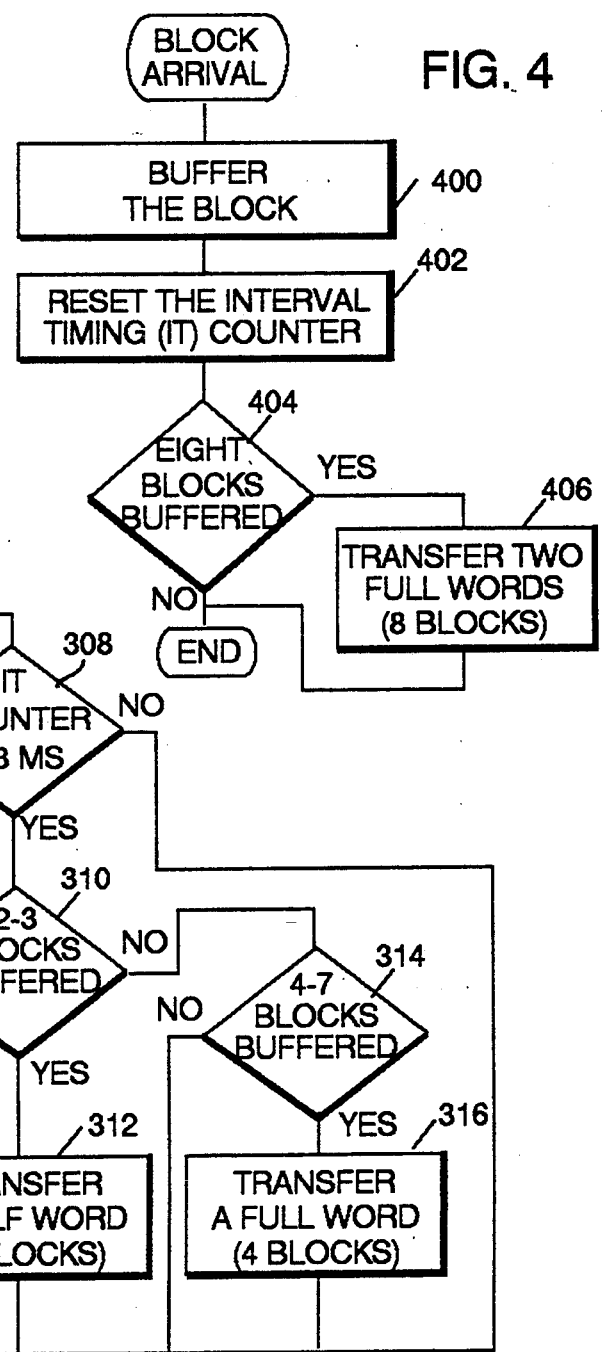
FIG. 3
FIG. 4

APPARATUS AND METHOD FOR OPTIMIZING BUS USAGE BY VARYING THE AMOUNT OF DATA TRANSFERRED ON A DMA OPERATION

This application is a continuation of application 07/514,475 filed Apr. 25, 1990, and now abandoned.

TECHNICAL FIELD

This invention relates to direct memory access (DMA) processes. More particularly, it relates to a technique for achieving efficient bus usage for DMA operations by dynamically varying the amount of data transferred on a DMA operation based on the amount of buffered data awaiting transfer and the recent data rate of arrival.

BACKGROUND OF THE INVENTION

Many direct memory access (DMA) controllers used for processing asynchronous data, such as bytes or other size blocks from terminals, transfer the data to memory via DMA operations as the blocks are received. This is done irrespective of the width of the memory bus, because it is not known if, and when, another block of data will be received. Moreover, for some environments, it may be necessary to effect DMA transfers relatively quickly. Such might be the case for echoing data back to terminals, for example. For slow rates of data arrival, e.g., 300 bits per second, the DMA transfer of bytes as they arrive carries little penalty. It is also appropriate when data arrives intermittently at slow rates. However, as data arrival rates increase, it becomes increasingly inefficient to perform a DMA operation for each block or byte of received data, if additional bus width is available for multiple data block transfers. Each DMA operation requires an arbitration for the memory bus which, in turn, consumes system resources.

The prior art contains many attempts to maximize bus usage and improve performance during DMA transfers. IBM Technical Disclosure Bulletin, Vol. 30, No. 12, May, 1988, page 211, describes a technique in which a DMA bus arbitration is requested only when the receive buffer contains a prescribed number of data blocks. This results in a larger data transfer to reduce the total amount of bus arbitrations. IBM Technical Disclosure Bulletin, Vol. 24, No. 10, Mar., 1982, page 5295, discloses an arrangement which provides for an automatic memory bus request for a subsequent DMA operation before a block presently being transferred is completed. This reduces buffer size requirements and the amount of microcode required for performing DMA transfers. U.S. Pat. No. 4,912,632, which issued on Mar. 27, 1990, relates to a memory subsystem controller including means for causing a DMA memory transfer to be interrupted at a cache memory line boundary to service a processor request and thereafter resume data transfer. U.S. Pat. application Ser. No. 297,778 relates to a DMA controller requiring no intervention from a main processor once the first of a series of block transfers has begun.

In many DMA architectures, the size and frequency of DMA transfers is fixed, as discussed above. In some applications, DMA performance can be improved by better understanding the data being processed. For example, in applications where data is being received rapidly, moving more data per DMA operation improves system performance because of the reduced overhead of negotiating for the bus. In applications where small or infrequent amounts of data are processed, moving the data as it is received may be optimal because of reduced latency of the processor acting on the information. The size of a typical DMA transfer is fixed at design time based on the constraints for that system. This poses a problem in that most applications can tolerate a relatively small variation in data rate before system performance deteriorates.

SUMMARY OF THE INVENTION

A system includes a processor, a main memory, one or more peripheral devices and a DMA controller. A system bus interconnects the processor, memory and the DMA controller. The controller improves bus usage during direct memory access transfers of data blocks by dynamically varying the size of DMA transfers. The controller includes means for buffering data blocks from the device as they arrive and means for dynamically activating a DMA operation and for varying the amount of data transferred on a DMA operation depending on the recent arrival rate of data and the amount of data already buffered for DMA transfer.

In a preferred embodiment, a timer monitors the time between the arrival of data blocks. The timer is reset each time a new data block is received. The output of the timer is continually decoded. At the same time, a count is kept of the number of data blocks already received, but not yet transferred via DMA operation. The timer output and received block count are combined to control the activation and size of DMA operations. As the interval between the receipt of data blocks increases (low data rate), the invention requires fewer blocks before performing a DMA operation. In the limit, a DMA operation is performed for each data block. At high data block arrival rates, a DMA operation is performed less often and, in the limit, only when the number of received data blocks is sufficient to fill at least the width of the memory bus.

The invention is primarily useful for asynchronous operation. For synchronous data, USARTS may provide END-OF- FRAME indications, at which time DMA operations may be performed. However, the invention may also be used for synchronous operation without penalty.

DESCRIPTION OF THE DRAWING

In the drawing,

FIGS. 3 and 4 show flow charts of the operations carried out by the illustrative bus circuit.

DETAILED DESCRIPTION

Figure 1:
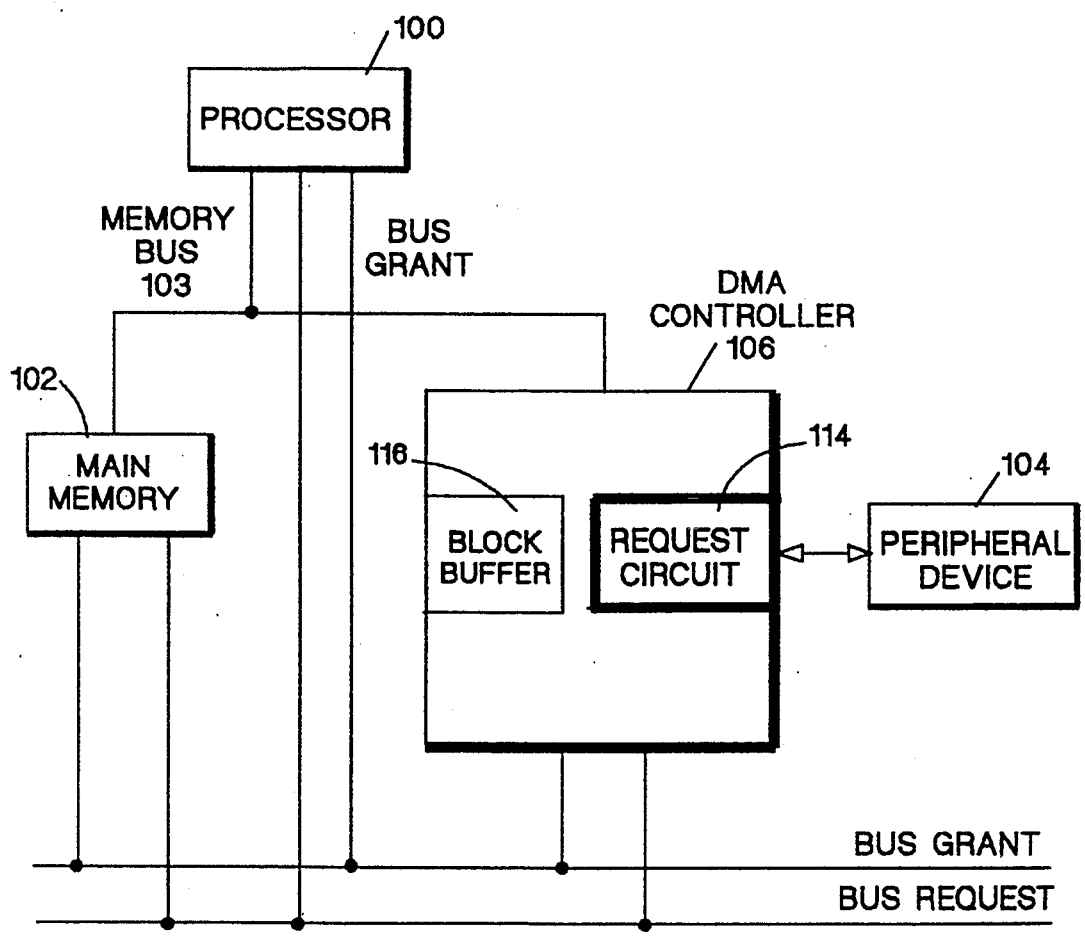
FIG. 1 shows one illustrative block diagram of a system suitable for practicing the invention, including a DMA controller containing the novel bus request circuit.

An illustrative system, as shown in FIG. 1, includes a processor 100, a main memory 102, a peripheral device 104 and a DMA controller 106, including a data block buffer 116, for arbitrating DMA data block transfers between the main memory and the peripheral device. Device 104 may be, for example, a terminal at which a user inputs data from a keyboard and receives data via an electronic display screen. Controller 106 includes a novel bus request circuit 114 which incorporates the invention. Other circuits of controller 106 are entirely conventional and are not discussed in detail.

Figure 2:
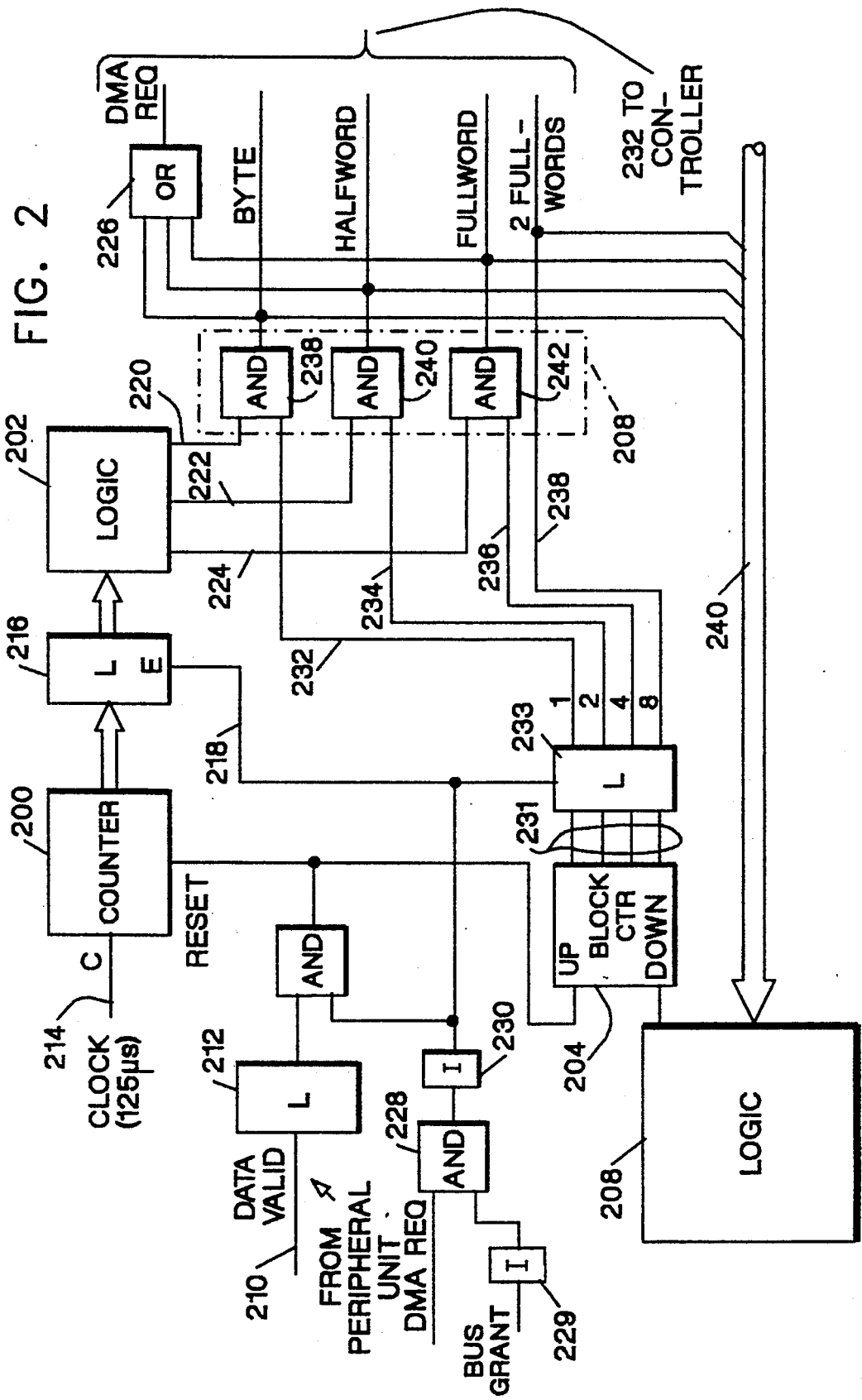
FIG. 2 shows the details of the bus request circuit.

The details of bus request circuit 114 are shown in FIG. 2. A flowchart of the internal timing operations is shown in FIG. 3. A counter 200 counts clock cycles to determine the time span between the receipt of data blocks from peripheral device 104. Of course, the invention is not limited to this illustrative arrangement and may pertain to the receipt of blocks from other devices as well, including the main memory 102. The state of counter 200 is decoded by combinatorial logic 202 to generate time count thresholds based on the rate of arrival of data blocks. A four bit up-down counter 204 is incremented each time a data block is buffered and decremented for each block that is transferred. The states of the buffer counter 204 stages are outputted directly via latch 230 to logic 208. The count threshold signals from logic 202 are combined with the output from up-down counter 204 by logic 208 to generate DMA bus request signals to the conventional circuits of controller 106. These request signals activate a DMA operation and identify the number of data blocks to be transferred when a bus grant signal is received. Once transferred, the logic 208 causes up-down counter 204 to be decremented by the number of transferred data blocks.

For illustrative purposes of this disclosure, it is assumed that a data block is one byte in length (8 bits) and that eight bytes can be buffered by the controller 106. It is further assumed for illustration that the memory bus 103 is 32 bits wide. A halfword transfer illustratively means a transfer of two bytes, while a fullword incorporates a full 32-bit bus transfer.

When a data block becomes valid, controller 106 notifies bus request circuit 114 by a signal on data valid lead 210. This signal is stored by latch 212 and used to reset the time counter 200 (FIG. 4-402). Counter 200 is continually incremented by system clock pulses on lead 214 (FIG. 3-300). The system clock operates illustratively at a 125 microsecond rate. As will be shown, in the illustrative embodiment, this clock frequency supports a wide range of rates of data block arrival, including rates of anywhere between 300 bits per second (bps) to 64 kilobits per second (kbps). Of course, other clock rates can be used for different data arrival rates, as required by the environment in which the invention is used. At 64 kbps, a byte is valid every 125 microseconds. Therefore, counter 200 will reach at least the value of one (1) between the arrival of each byte. For continuous data arrival at 300 bps, approximately 37 bytes arrive every second. At a clock rate of 125 microseconds, this translates to a counter 200 count of at least 213 for each block arrival. Counter 200 is illustratively 8 bits wide to support this count of 213.

Latch 216 is ordinarily enabled. Therefore, the count from counter 200 is ordinarily passed to logic 202, which operates on it asynchronously. When a bus request signal is generated by logic 208, the output of latch 216 is locked by a low-going signal on lead 218 to stabilize the request circuit 114 signals to controller 106 while awaiting a bus grant signal. The DMA request signal from OR gate 226 is sent to the controller 106 and also to AND gate 228. The bus grant signal from controller 106 is inverted by inverter 229 to fully enable AND gate 228 before the bus grant is received. The output of AND gate 228 is inverted by inverter 230 to disable latch 216. The same signal also disables latch 233 between up-down counter 204 and logic 208, as discussed below.

Logic 202 generates signals on its outputs based on the time count from counter 200. Logic 202 decodes this count state and produces a signal on lead 220 if the count equals or exceeds 96. Similarly, logic 202 generates signals on leads 222 and 224 for time counts equal to or exceeding 24 and 3, respectively. These time threshold signals are combined with the buffered data count from up-down counter 204 to generate an appropriate DMA request. To accomplish this, latch 233 is also disabled by the output of inverter 230 to lock in and stabilize the count from counter 204 to logic 208. Logic 208 functions as follows. In the case in which only one byte is buffered (lead 232 high) (FIG. 3-304), if logic 202 generates a signal on lead 220, meaning that the count from counter equals or exceeds 96 (FIG. 3-302), AND gate 238 of logic 208 generates a request on the BYTE lead of 232 to request a transfer of one byte (FIG. 3-306). If another byte is buffered before counter 200 reaches a state of 96, the time counter 200 is reset (FIG.4-402) and the up-down counter 204 is incremented by one by the signal from latch 212. Now two bytes of data are buffered. The time counter 200 increments from zero until the halfword count threshold (24 in this illustrative circuit) is met (FIG. 3-308), at which time a halfword DMA operation is requested by logic 208 (FIG. 3-312). If a third byte is buffered before the time count threshold of 28 is exceeded, a halfword transfer will still be requested at that time. Continuing, if two or three bytes are buffered (lead 234 high) and the time count from counter 200 equals or exceeds 28, AND gate 240 requests a transfer of a halfword (two bytes). Similarly, if four through seven bytes are buffered (FIG. 3-314) and the time count threshold equals or exceeds 3 (FIG. 3-308), AND gate 242 requests a fullword (four bytes) transfer (FIG. 3-316).

Now consider the case when data is arriving so quickly that counter 200 is incremented only a few times before being reset. In this case, the lowest time count threshold from counter 200 that is recognized by logic 202 (three, which results in a fullword transfer) may never be reached. However, this is not a problem, because when the data buffer count from counter 204 reaches 2 fullwords (FIG. 4-404), logic 208 generates a request on lead 238 to transfer two fullwords, (FIG. 4-406) regardless of the time count. A request to transfer two fullwords requires the conventional circuits of controller 106 to perform two full bus transfer operations, assuming a 32-bit bus. Alternatively, some controllers also have the ability to operate in what is called "burst" mode. Burst mode allows the transfer of successive blocks slated for storage in successive addresses. However, blocks following the initial block of a burst mode do not need to be accompanied by a storage address. Whenever data is transferred, the number of transferred data blocks is subtracted from the block count in up-down counter 204 to properly control block transfer so that odd amounts of data pose no residual data problems. The decrementing of counter is performed by logic 208 in response to signals to logic 208 on bus 240.

Table 1 below shows illustrative block transfers requested by bus request circuit 114, assuming that data is continuously arriving at the stated rates and that counter 202 is incremented at a 125 microsecond rate.

TABLE 1

| DATA RATE | COUNTER 200 | COUNTER 200 THRESHOLD | TRANSFER SIZE |
| --- | --- | --- | --- |
| 64 KBS | 1 | NEVER REACHED | 2 FULLWORDS |
| 38.4 KBS | 2 | NEVER REACHED | 2 FULLWORDS |
| 32 KBS | 2 | NEVER REACHED | 2 FULLWORDS |
| 19.2 KBS | 3 | 3 | FULLWORD |
| 9600 BPS | 6 | 3 | FULLWORD |
| 4800 BPS | 13 | 3 | FULLWORD |
| 2400 BPS | 26 | 24 | HALFWORD |
| 1200 BPS | 54 | 24 | HALFWORD |
| 600 BPS | 111 | 96 | BYTE |
| 300 BPS | 213 | 96 | BYTE |

It is to be understood that the above described arrangements are merely illustrative of the application of principles of the invention and that other arrangements may be devised by workers skilled in the art without departing from the spirit and scope of the invention.

I claim:

1. In a system including a processor, a memory, one or more peripheral devices, a direct memory access controller including a buffer for buffering data blocks from the peripheral devices, and a bus interconnecting said processor, memory and controller, wherein data blocks arrive for buffering at a data rate which varies between a high rate and lower rates, a bus request arrangement connected to said peripheral devices and to said direct memory access controller for improving bus efficiency during direct memory access transfers by dynamically varying how many data blocks transferred on each direct memory access transfer between said peripheral devices and said memory, said bus request arrangement comprising:

counting means for counting a total number of buffered data blocks in said buffer, measuring means for measuring a variable interval of time between consecutive data blocks arriving for buffering, and means, including said direct memory access controller responsive to said measuring means and said counting means, for selectively transferring on a single transfer on said bus a variable number of buffered data blocks from said buffer to said memory, in order to increase bus efficiency by increasing the variable number of data blocks transferred on a direct memory access transfer as said interval decreases and said total number of buffered data blocks increases.

2. A bus requester for improving bus efficiency during direct memory access data block transfer via a bus between a system memory and a peripheral device by varying how much data is transferred during said direct memory access block transfer, comprising:

data block buffering means connected to said system memory and said peripheral device, first counting means, responsive to receipt of data blocks by said buffering means, for counting how many data blocks are buffered in said buffering means, a timer, means, responsive to receipt of a data block by said buffering means, for activating said timer to begin measuring time when a data block is received by said buffering means, and means selectively responsive to time measured by said timer and to said first counting means for generating a direct memory access transfer and for determining a number of buffered data blocks to be transferred between said memory and said peripheral device on said direct memory access transfer, such that said number of data blocks to be transferred on said direct memory transfer is smaller as the time measured by said timer increases.

3. The bus requester of claim 2 wherein the timer further comprises:

second counting means responsive to receipt of a data block to begin counting from a reset state, and clock means for incrementing said second counting means at a periodic rate that is faster than a maximum rate of receipt of data blocks for buffering.

4. The bus requester of claim 3 wherein said means for generating said direct memory access transfer and for determining the number of buffered data blocks to be transferred further comprises:

first logic means responsive to said second counting means for generating a plurality of count threshold signals, and second logic means responsive to said count threshold signals and to said first counting means for generating block size signals identifying said number of buffered data blocks to be transferred.

5. The bus requester of claim 4 further comprising third logic means responsive to said block size signals for decrementing said first counting means by an amount equal to said number of buffered data blocks transferred.

6. The bus requester of claim 2 further comprising:

means connected to said first counting means and responsive to a predetermined threshold number of buffered data blocks within said buffering means for requesting a transfer of a fixed number of buffered data blocks irrespective of said timing state of said timer.

7. A method for optimizing bus efficiency by varying how many data blocks are transferred during a direct memory access transfer, a bus that is connected between a system memory and a peripheral device, said bus having a bus block width, comprising the steps of:

buffering data blocks as they are received, and selectively transferring on a single access of said bus a number of buffered data blocks on said direct memory access transfer, said number being based on a total number of buffered data blocks and a time interval since receipt of a last data block, such that as said time interval increases said transfer occurs at a low frequency and fewer data blocks are transferred during each transfer, and as said time interval decreases said transfer occurs at higher frequencies and the number of data blocks transferred during each transfer increases, until finally said transfer occurs independent of said time interval whenever said number of buffered data blocks transferred equals said bus block width whereupon the number of data blocks transferred equals said bus block width.

8. A method for improving bus efficiency during direct memory access data block transfers via a bus that is connected between a system memory and a peripheral device, by varying how many data blocks are transferred during a direct memory access transfer, comprising the steps of:

buffering data blocks as they are received, maintaining a count of buffered data blocks, timing an interval since last receipt of a data block for buffering, and transferring on a single direct memory access of said bus a number of data blocks, said number of data blocks transferred on a single direct memory access being based on said count of buffered data blocks and said interval since receipt of the last data block for buffering, said number of data blocks transferred on a single direct memory access varying as an inverse function of said interval.

9. The method of claim 8 further comprising the steps of:

decrementing said count of buffered data blocks by an amount equal to said number of data blocks transferred.

10. In a system including a processor, a memory, one or more peripheral devices, a direct memory access controller including a buffer for buffering data blocks, and a bus having a width and interconnecting said processor, memory and controller, a bus request arrangement included in said direct memory access controller and connected to said peripheral devices for improving bus efficiency during direct memory access transfers of data blocks between said peripheral devices and said memory by varying how many data blocks are transferred during a direct memory access transfer, said bus request arrangement comprising:

means for measuring an arrival rate of data blocks for buffering, and means for selectively transferring on a single transfer of said bus a number of buffered data blocks from said buffer to said memory on a direct memory access transfer, said number being based on a total number of buffered data blocks and said arrival rate of data blocks for buffering, such that as said arrival rate of data blocks for buffering increases, a larger number of buffered data blocks are transferred on a direct memory transfer, until a predetermined threshold rate is reached, after which the number of buffered data blocks transferred on said direct memory transfer is independent of said arrival rate of data blocks and equals the width of said bus.

11. A method for optimizing bus efficiency during direct memory access data block transfers via a bus having a data block width, said bus being connected between a system memory and a peripheral device by varying how many data blocks are transferred during a direct memory access transfer, comprising the steps of:

buffering data blocks as they are received, measuring a total number of buffered data blocks, measuring an arrival rate of data blocks for buffering, and selectively transferring on a single access of said bus a number of buffered data blocks on said direct access memory transfer, said number of buffered data blocks transferred on a single direct memory access being based on said total number of buffered data blocks and said arrival rate of data blocks for buffering, such that as said arrival rate of data blocks increases, a larger number of buffered data blocks are transferred on a single direct memory access, until a predetermined threshold arrival rate is exceeded, after which the number of buffered data blocks transferred on a single direct memory access is independent of said measured arrival rate of data blocks for buffering and said number equals said data block width of said bus.

* * * * *